Sept. 13, 1960
G. R. DONALDSON ET AL
2,952,715
HYDROISOMERIZATION PROCESS
Filed Dec. 29, 1958
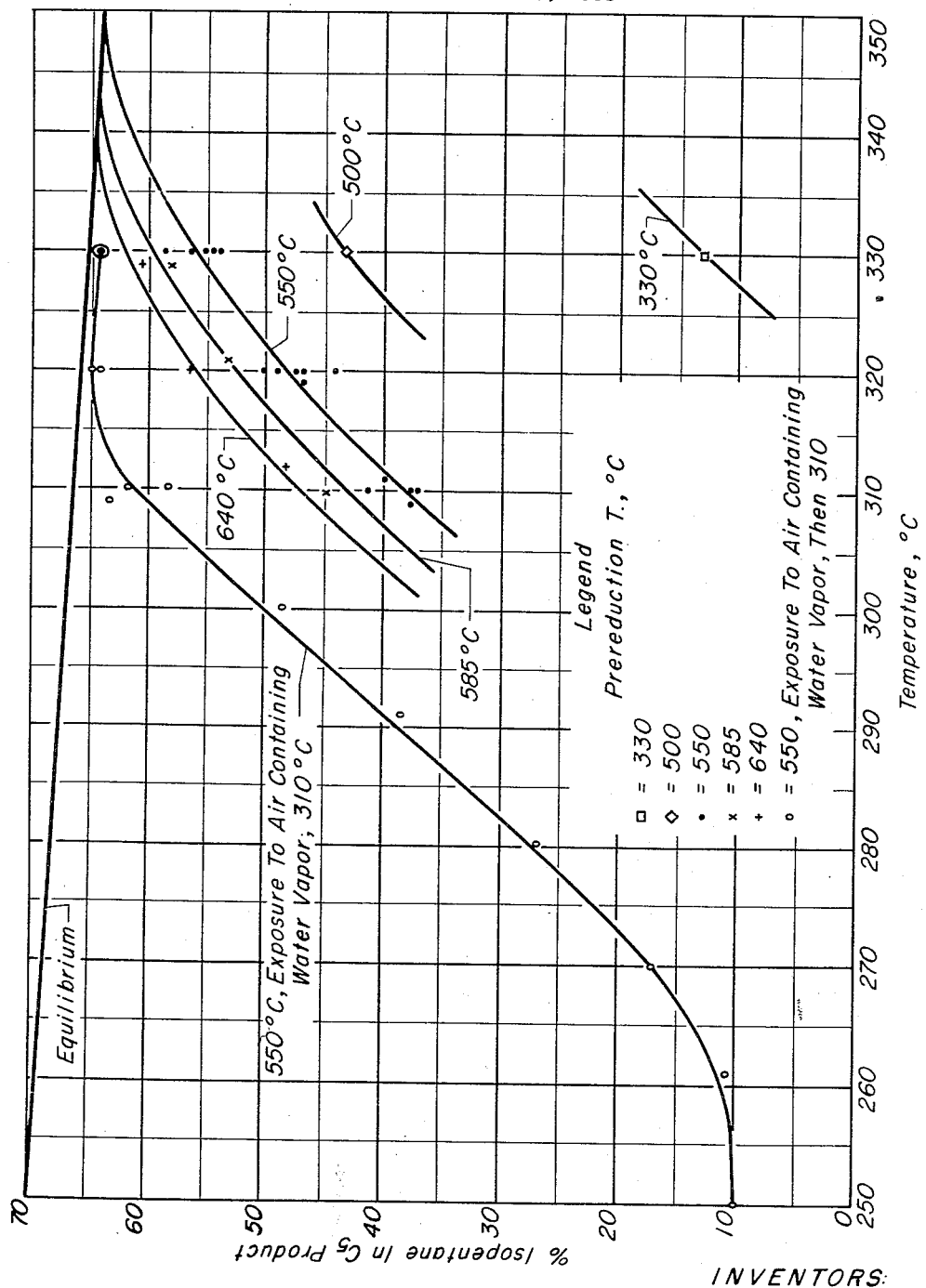
INVENTORS:
George R. Donaldson
Fredrick J. Riedl
BY:
ATTORNEYS

United States Patent Office 2,952,715
Patented Sept. 13, 1960

2,952,715

HYDROISOMERIZATION PROCESS

George R. Donaldson, Barrington, and Fredrick J. Riedl, Cicero, Ill., assignors, by mesne assignments, to Universal Oil Products Company, Des Plaines, Ill., a corporation of Delaware Filed Dec. 29, 1958, Ser. No. 783,253

17 Claims. (Cl. 260—666)

This invention relates to the hydroisomerization of an isomerizable hydrocarbon and relates more particularly to a method of maximizing catalyst activity in such a process.

In recent years with the advances in the automotive industry, fuels of relatively high octane ratings have been found necessary. Many methods have been provided for the production of such high octane rating fuels. These methods include processes such as alkylation, catalytic reforming, catalytic cracking, and high temperature thermal cracking and thermal reforming operations. Other processes which may be considered in one sense auxiliary were developed, for example, isomerization, which was employed to produce isoparaffins which subsequently were reacted with olefins to form a high octane number motor fuel boiling range fraction. In addition to the production of one of the reactants for isoparaffin alkylation, isomerization was also utilized to increase the anti-knock quality of saturated hydrocarbons such as paraffins and/or naphthenes found in selected fractions of gasolines and naphthas. An example of the latter type of operation is a process in which pentane and/or hexane boiling range fractions are isomerized to produce isopentane and/or isomeric hexanes which subsequently may be employed as blending agents in automotive and aviation fuels.

In most of the above mentioned isomerization processes, catalytic agents were employed to effect the desired molecular rearrangement. Ordinarily, these catalytic agents have consisted of metal halides, such as aluminum chloride, aluminum bromide, etc., which have been activated by the addition of the corresponding hydrogen halide. These catalytic agents are initially very active and effect high conversion per pass. However, the activity of these catalysts is so high that the catalysts accelerate decomposition reactions as well as isomerization reactions with the result that the ultimate yield of isomerized product is reduced. These decomposition reactions also considerably increase catalyst consumption by reaction of fragmental material with the catalytic agent to form sludge-like material. In spite of what might have been predicted, these decomposition and/or cracking reactions cannot be reduced by simply decreasing reaction zone severity as, for example, by lowering the reaction zone temperature or by increasing the space velocity of the reactants through the reaction zone. At temperatures and space velocities at which satisfactory isomerization reactions are obtained, these decomposition reactions are pronounced.

Recently it has been disclosed that a catalyst comprising a refractory oxide, a platinum group metal, and from about 0.1 to about 10% by weight of combined halogen, and more particularly, from about 2.0% to about 5% by weight of combined fluorine, can be utilized for the isomerization of hydrocarbons. This catalyst is particularly useful when the isomerization of hydrocarbons is carried out in the presence of added hydrogen. The term hydroisomerization has been applied to such processes for the molecular rearrangement of hydrocarbons in the presence of such a catalyst. A particularly preferred catalyst for the hydroisomerization of hydrocarbons in the presence of hydrogen is one which comprises alumina, platinum, and from about 2.0% to about 5.0% by weight of fluorine. In utilizing such a catalyst in a hydroisomerization process, it has unexpectedly been found that the relative catalyst activity can be raised substantially if prior to contact of isomerizable hydrocarbons with said catalyst, the catalyst is prereduced at relatively high temperature, exposed to air containing water vapor, and rereduced at hydroisomerization conditions. This and other features of the process of the present invention will be set forth hereinafter in detail.

In one embodiment, this invention relates to an improved process for the hydroisomerization of an isomerizable hydrocarbon at hydroisomerization conditions in the presence of hydrogen and a catalyst comprising a refractory oxide, a platinum group metal, and combined halogen, the improvement which comprises (1) treating said catalyst with hydrogen at a temperature of from about 425° to about 700° C., (2) exposing said catalyst to air containing water vapor, and (3) retreating said catalyst with hydrogen at hydroisomerization conditions, steps (1), (2) and (3) being carried out prior to contact of said catalyst with the hydrocarbon.

In another embodiment, this invention relates to an improved process for the hydroisomerization of an isomerizable saturated hydrocarbon at hydroisomerization conditions in the presence of hydrogen and a catalyst comprising a refractory metal oxide, platinum, and from about 2.0 to about 5.0% by weight fluorine, the improvement which comprises (1) treating said catalyst with hydrogen at a temperature of from about 425° to about 700° C., (2) exposing said catalyst to air containing water vapor, and (3) retreating said catalyst with hydrogen at hydroisomerization conditions, steps (1), (2) and (3) being carried out prior to contact of said catalyst with the saturated hydrocarbon.

In a still further embodiment, this invention relates to an improved process for the hydroisomerization of an isomerizable paraffin hydrocarbon at hydroisomerization conditions in the presence of hydrogen and a catalyst comprising alumina, platinum, and from about 2.0 to about 5.0% by weight fluorine, the improvement which comprises (1) treating said catalyst with hydrogen at a temperature of from about 425° to about 700° C., (2) exposing said catalyst to air containing water vapor, and (3) retreating said catalyst with hydrogen at hydroisomerization conditions, steps (1), (2) and (3) being carried out prior to contact of said catalyst with the paraffin hydrocarbon.

In a specific embodiment, this invention relates to an improved process for the hydroisomerization of n-butane at hydroisomerization conditions in the presence of hydrogen and a catalyst comprising alumina, platinum, and from about 2.0 to about 5.0% by weight fluorine, the improvement which comprises (1) treating said catalyst with hydrogen at a temperature of from about 425° to about 700° C., (2) exposing said catalyst to air containing water vapor at ambient temperature, and (3) retreating said catalyst with hydrogen at hydroisomerization conditions, steps (1), (2) and (3) being carried out prior to contact of said catalyst with the n-butane.

In another specific embodiment, this invention relates to an improved process for the hydroisomerization of n-pentane at hydroisomerization conditions in the presence of hydrogen and a catalyst comprising alumina, platinum, and from about 2.0 to about 5.0% by weight fluorine, the improvement which comprises (1) treating said catalyst with hydrogen at a temperature of from about 425° to about 700° C., (2) exposing said catalyst to air containing water vapor at ambient temperature, and (3)

retreating said catalyst with hydrogen at hydroisomerization conditions, steps (1), (2) and (3) being carried out prior to contact of said catalyst with the n-pentane.

In a still further specific embodiment, this invention relates to an improved process for the hydroisomerization of n-hexane at hydroisomerization conditions in the presence of hydrogen and a catalyst comprising alumina, platinum, and from about 2.0 to about 5.0% by weight fluorine, the improvement which comprises (1) treating said catalyst with hydrogen at a temperature of from about 425° to about 700° C., (2) exposing said catalyst to air containing water vapor at ambient temperature, and (3) retreating said catalyst with hydrogen at hydroisomerization conditions, steps (1), (2) and (3) being carried out prior to contact of said catalyst with the n-hexane.

The process of this invention is particularly applicable to the hydroisomerization of isomerizable saturated hydrocarbons including paraffin hydrocarbons and cycloparaffin hydrocarbons and is still more particularly suitable for the hydroisomerization of straight chain or slightly branched chain paraffins containing four or more carbon atoms per molecule. Saturated hydrocarbons which are hydroisomerized in accordance with the process of this invention include n-butane, n-pentane, n-hexane, 2-methylpentane, 3-methylpentane, n-heptane, 2-methylhexane, 3-methylhexane, n-octane, etc., and cycloparaffins ordinarily containing at least five carbon atoms in the ring such as alkylcyclopentanes and cyclohexanes including methylcyclopentane, dimethylcyclopentane, cyclohexane, methylcyclohexane, dimethylcyclohexane, ethylcyclohexane, etc. The process is also applicable to the hydroisomerization of mixtures of paraffins and/or naphthenes such as those derived by selective fractionation of straight run or natural gasolines or naphthas. Such mixtures of paraffins and/or naphthenes include so-called pentane fractions, hexane fractions, etc., and mixtures thereof. The process of this invention is also applicable to the hydroisomerization of olefins, such as the hydroisomerization of 1-butene to 2-butene, the hydroisomerization of 3-methyl-1-butene to 2-methyl-2-butene, etc. The process of this invention may be used, in addition, for the hydroisomerization of alkyl aromatic hydrocarbons, for example, the hydroisomerization of ethylbenzene to dimethylbenzene or xylene, the hydroisomerization of propylbenzene to methylethylbenzene or trimethylbenzene, the hydroisomerization of one xylene isomer to an equilibrium mixture of xylene isomers, etc.

The catalyst used in the process of the present invention comprises a refractory oxide, a platinum group metal, and from about 0.1 to about 10% by weight of combined halogen. The refractory oxide is a solid and may be selected from diverse refractory oxides which are not necessarily equivalent as supports. Among suitable refractory oxides are various substances such as silica, alumina, titanium dioxide, zirconium dioxide, chromia, zinc oxide, silica-alumina, chromia-alumina, alumina-boria, silica-zirconia, etc., and various naturally occurring refractory metal oxides of various states of purity such as bauxite, kaolin and bentonite clay which may or may not have been acid treated, diatomaceous earths such as kieselguhr, montmorillonite, spinels such as magnesium oxide-alumina spinels or zinc oxide spinels, etc. Of the above mentioned refractory oxides, alumina is preferred and particularly preferred is synthetically prepared substantially anhydrous gamma alumina of a high degree of purity. In the present specification and appended claims, the term alumina is employed to mean porous aluminum oxide in all states of hydration, as well as aluminum hydroxide. The alumina may be synthetically prepared or naturally occurring and it may be of the crystalline or gel type. Whatever type of alumina is employed, it may be activated prior to use by one or more treatments including treatment with acid, alkalis, and other chemical compounds, drying, calcining, steam, etc. It may be in the form known as activated alumina, activated alumina of commerce, porous alumina, alumina gel, etc. The various forms of alumina are known by many trivial and trade names and it is intended to include all such forms. The typical aluminas hereinabove described are intended as illustrative rather than limiting on the scope of the present invention.

In the catalysts used in the process of the present invention, the above mentioned refractory oxides have composited therewith a platinum group metal and from about 0.1% to about 10% by weight combined halogen. By a platinum group metal is meant a noble metal, excluding silver, gold, and mercury, and which platinum group metal is selected from the group consisting of platinum, palladium, ruthenium, rhodium, osmium, and iridium. These metals are not necessarily equivalent in activity in the catalysts utilized in the process of this invention, and of these metals, platinum and palladium are preferred, and platinum itself is particularly preferred. With the solid composite of refractory oxide and a platinum group metal for use as a catalyst in the process of the present invention is associated what is known in the art as combined halogen. The combined halogen is present in from about 0.1% to about 10% by weight based on the weight of the refractory oxide. In a particularly preferred embodiment, the combined halogen is fluorine and this fluorine is present in an amount of from about 2.0% to about 5.0% by weight.

The preferred catalyst composition comprises alumina, platinum, and from about 2.0% to about 5.0% by weight of combined fluorine. As stated hereinabove, the alumina is preferably synthetically prepared substantially anhydrous gamma alumina and of a high degree of purity. The methods of preparation of such synthetically prepared gamma aluminas are well known. For example, they may be prepared by the calcination of alumina gels which are commonly formed by adding a suitable reagent such as ammonium hydroxide, ammonium carbonate, etc., to a solution of a salt of aluminum, such as aluminum chloride, aluminum sulfate, aluminum nitrate, etc., in an amount to form an aluminum hydroxide gel which on drying and calcination is converted into gamma alumina. It has been found that aluminum chloride is generally preferred as the aluminum salt, not only for convenience in subsequent washing and filtering procedures, but also because it appears to give the best results. Alumina gels may also be prepared by the reaction of sodium aluminate with a suitable acidic reagent to cause precipitation thereof with the resultant formation of an aluminum hydroxide gel. Synthetic aluminas may also be prepared by the reaction of metallic aluminum with hydrochloric acid, acetic acid, etc., to form alumina sols. These sols can be gelled with suitable precipitation agents such as ammonium hydroxide, followed by drying and calcination. The fluorine in an amount of from about 2.0% to about 5.0% by weight can be incorporated into the alumina in any suitable manner, for example, by the addition of a suitable quantity of hydrofluoric acid to the alumina sol or alumina gel prior to drying and calcination thereof. In another manner, aluminum fluoride in the desired amount can be added to alumina gels, thus yielding an alumina having the desired quantity of fluorine combined therewith. In any of the above instances where the alumina is prepared from either an alumina sol or alumina gel, the resultant product is calcined to a sufficient temperature to convert the product into gamma alumina. While such resultant aluminas may contain relatively small amounts of water of hydration, substantially anhydrous gamma alumina containing from about 2.0% to about 5.0% by weight combined fluorine is the preferred synthetically prepared alumina containing combined fluorine for use in the preparation of the finished catalyst for use in the process of the present invention.

The preferred synthetically prepared alumina containing 2.0% to about 5.0% by weight of combined fluorine, as hereinabove set forth, then has a platinum group metal combined therewith. This platinum group metal, particularly platinum, may be composited with the alumina in any of many well known methods. For example, an ammoniacal solution of chloroplatinic acid may be admixed with the fluorinated alumina followed by drying and reduction. In another method, chloroplatinic acid in the desired quantity can be added to an alumina gel slurry followed by the precipitation of the platinum therefrom by means of hydrogen sulfide or another sulfiding agent. In still another method, the platinum may be coprecipitated with the alumina gel, for example, by the introduction of a suitable platinum compound into an alumina sol followed by the addition of a precipitation agent thereto. In another method, chloroplatinic acid may be dissolved in dilute acid or mixed acid solutions, for example, in hydrochloric acid, nitric acid, sulfuric acid, a mixture of hydrochloric and nitric acids, etc., and these resultant solutions used for impregnation. While the amount of platinum compounded with the fluorinated alumina is not critical, for economic reasons, this amount of platinum is usually kept at a minimum. Thus, large amounts of platinum do not cause a detrimental effect. However, it is generally preferred to utilize from about 0.01% to about 2% by weight of platinum based on the dry alumina.

While the form of the finished catalytic composite is not critical, it is generally preferred to utilize macro size particles so that the total composite may be utilized as a fixed bed in a reaction zone. Thus, it is desirable to form the synthetically prepared alumina either before or after the platinum is composited therewith into particles, for example, of 1/16" x 1/16" or 1/8" x 1/8", etc. This can be accomplished in one manner by grinding the dried fluorinated alumina and pilling the resultant product with an organic binder such as stearic acid by known techniques followed by calcination. Alternatively, the particles may be in the form of spheres from spray drying or dropping, or they may be in the form of irregularly shaped particles such as result from extrusion. While it is not meant to limit the invention to particles of any particular size, the above mentioned composites are definitely preferred.

After the platinum in the desired concentration has been fixed on the alumina, the mixture is preferably dried at a temperature of from about 100° to about 200° C. for a period of time ranging from about four to about twenty-four hours. The catalyst may now be subjected to high temperature treatment, and this may consist of one or more methods. The preferred method is to subject the catalyst to calcination at a temperature of from about 425° to about 650° C. for a period of from about two to about eight hours or more. Another method is to subject the catalyst to hydrogen or to hydrogen-containing gases at a temperature of from about 150° to about 300° C. for about four to about twelve hours or more, preferably followed by calcination at a temperature of from about 425° to about 650° C. In still another method, the catalyst may be subjected to reduction with hydrogen or hydrogen-containing gases at a temperature of from about 425° to about 650° C. for a period of from about two to about ten hours or more.

The process of this invention is directed towards the hydroisomerization of an isomerizable hydrocarbon, and in particular, is directed towards the hydroisomerization of an isomerizable saturated hydrocarbon. As stated hereinabove, this hydroisomerization is characterized in one respect in that the process is carried out in a hydrogen atmosphere. While the use of hydrogen in processes of this general type as a cracking suppressor has been disclosed previously, it is felt that hydrogen pressure or partial pressure is an important variable in this process. A sufficient quantity of hydrogen should be utilized so that the hydrogen to hydrocarbon ratio of the combined reaction zone feed will be within the molar range of from about 0.25 to about 10. When smaller quantities of hydrogen are utilized, the catalyst rapidly deactivates, and the desired hydroisomerization reactions decrease while cracking reactions become prominent. The use of too much hydrogen is also detrimental since the hydroisomerization reaction can be stopped completely by such means. The hydrogen can be supplied from any convenient source and will generally be recycled within the process so that hydrogen consumption will be, for all practical purposes, very small. The hydrogen utilized may be purified or may be diluted with various inert materials such as nitrogen, methane, ethane, and/or propane. Also, small amounts of sulfur in the feed stocks can be tolerated without harmful effects on the catalyst utilized herein.

As hereinabove set forth, the catalyst utilized in the process of this invention has high hydroisomerization activity with minimum cracking activity and is capable of catalyzing the hydroisomerization of hydrocarbons to equilibrium mixtures thereof under reaction conditions where high amounts of cracking have previously been observed when attempts have been made to utilize catalysts other than those now disclosed. Recently, processes have been proposed for the isomerization or hydroisomerization of pentane and/or hexane fractions utilizing noble metal-containing catalysts. Such processes have been said to be extremely temperature sensitive. Thus, equilibrium mixtures of hydrocarbons are attained in such processes only with considerable loss in hydrocarbon charge, thus making such processes generally undesirable from an economic standpoint. With the type of catalyst herein disclosed, hydroisomerization of hydrocarbons to equilibrium mixtures thereof can be attained at reaction zone conditions wherein such losses are minimized. Decomposition reactions, such as occur in prior art processes, cause rapid catalyst deactivation and thus, necessitate either shut-down for catalyst change or for catalyst regeneration. Use of the herein disclosed catalysts results in processes which can be operated for extended periods of time with minimum carbonization due to decomposition reactions. However, some carbon laydown, although small, has been noted. As a result thereof, it has been found desirable to maximize catalyst activity, thus allowing minimum severity of operating conditions. By the use of the process of the present invention in which, prior to use, the catalyst is treated with hydrogen at a temperature of from about 425° to about 700° C., exposed to air containing water vapor, and retreated with hydrogen at hydroisomerization conditions, it has been found that the activity of these catalysts can be further increased so that milder processing conditions can be utilized. Such milder processing conditions allow operation for still greater extended periods of time, thus resulting in a still further economic advantage for this process in comparison to those described in the prior art.

As set forth hereinabove, the present invention relates to an improved process for the hydroisomerization of an isomerizable hydrocarbon at hydroisomerization conditions in the presence of hydrogen and a catalyst comprising a refractory oxide, a platinum group metal, and combined halogen, the improvement which comprises (1) treating said catalyst with hydrogen at a temperature of from about 425° to about 700° C., (2) exposing said catalyst to air containing water vapor, and (3) retreating said catalyst with hydrogen at hydroisomerization conditions, steps (1), (2) and (3) being carried out prior to contact of said catalyst with the hydrocarbon. As stated, the first step for maximizing catalyst activity is carried out prior to use thereof and comprises treating said catalyst with hydrogen at a temperature of from about 425° to about 700° C. The hydrogen to be utilized in this treating step may be pure or may be diluted with various inert components including nitrogen, helium, methane, ethane, etc. The treatment is carried out at a temperature of from about 425° to about 700° C., although temperatures within the more limited range of from about 475° to about 650° C. are generally preferred. Pressure does not appear to be an important variable in this pretreatment step, and thus, the temperature may range from about atmospheric to about 250 atmospheres or more. The time for which this pretreatment step is carried out is generally greater than one hour and less than twenty hours, although longer periods of time can be utilized but do not appear to have any further advantage. In one manner of operation, the catalyst, after preparation, is placed as a fixed bed in a reaction zone and hydrogen passed thereover. The hydrogen may be preheated by means of a suitable furnace or the heat may be supplied to the fixed bed of catalyst by means of external reactor heating means. In one manner of operation, the initial treating may be carried out for one to five hours or more at atmospheric pressure, and then an additional period of treating may be carried out at the same temperature but at high pressure, for example, at 500 pounds per square inch.

After the initial treatment of the catalyst with hydrogen at a temperature of from about 425° to about 700° C., the catalyst is exposed to air containing water vapor, preferably at an ambient temperature. This exposure to air containing water vapor may be carried out with the catalyst in place in the reactor, for example, by purging the reactor with nitrogen to remove residual hydrogen, followed by gradual introduction of air containing water vapor. In another manner, the catalyst may be cooled to the temperature of the atmosphere surrounding the reactor, and then dropped from its place in the reactor and thus exposed to air containing water vapor. Neither temperature nor pressure appear to be important variables in this process step. Thus, the temperature may range from about 10° to about 600° C., although temperatures within the range of from about 10° to about 200° C. are generally preferred. In any case, the temperature will be the ambient temperature provided by the catalyst surroundings. Furthermore, time does not appear to be an important variable in this step of exposure of the catalyst to air containing water vapor, and thus, the time may range from about one minute to about seventy-two hours or more. Obviously, time and temperature are interrelated, the shorter times going with the higher temperatures, and the longer times with the lower temperatures. The relative humidity of the air to be utilized may be varied over a relatively wide range of from about 1% to about 100% relative humidity. The exact manner in which the air containing water vapor influences the catalyst to provide a maximizing effect on catalyst activity is not understood. It may provide sufficient moisture to activate the combined halogen component of the catalyst, or it may be decomposed by the platinum group metal into hydrogen and oxygen. The oxygen in turn may cause oxidation or partial oxidation of one or more of the catalyst components, for example, the platinum. Whether or not any of these theories or another theory is the correct one, no intention is meant to limit the invention to any one or more thereof.

Depending upon whether or not the catalyst has been removed from the reactor for exposure to air containing water vapor, or whether the exposure to air containing water vapor has been carried out in situ, the catalyst is next placed in the reactor and retreated with hydrogen at hydroisomerization conditions. It has been found that retreatment at such conditions further maximizes catalyst activity in sharp contrast to retreatment of the catalyst with hydrogen at higher temperatures. This phenomena will be set forth more fully and described more completely in connection with the examples and the attached drawing. At any rate, the hydroisomerization conditions referred to for this retreating step with hydrogen prior to use of the catalyst in the process include temperatures of from about 250° to about 400° C., pressures of from about 5 to about 100 atmospheres and times of from about one to about ten hours or more. The use of such conditions for retreatment of the catalyst with hydrogen will be demonstrated fully in the examples to follow.

As stated hereinabove, the final retreatment of the catalyst with hydrogen at hydroisomerization conditions is generally carried out in situ in the same reactor in which hydroisomerization of the hydrocarbon is to be carried out. After maximization of the catalyst activity, processing of the hydrocarbon, along with hydrogen, is begun. Generally, the isomerizable hydrocarbon will be passed over the catalyst at a temperature within the range of from about 250° to about 320° C., although temperatures within the more limited range of from about 275° to about 310° C. can be utilized satisfactorily. In some cases, it may be advantageous to carry out the processing at higher temperatures, particularly when a close approach to equilibrium is desired. Thus, the use of temperatures within the range of from about 250° to about 475° C. may prove advantageous in a particular application. Since catalyst activity has been maximized by the process steps of the present invention, carried out prior to use of the catalyst for hydrocarbon processing, the temperature within this broad range will be lower than would have been found to be necessary prior to this invention. The pressure utilized for continuous processing will be within the general range of from about 100 pounds per square inch to about 1500 pounds per square inch or more.

As set forth hereinabove, the hydroisomerization process of the present invention utilizing the above described catalyst, pretreated in the described manner, is particularly adapted for a so-called fixed bed type process. In such a process, the compound or compounds to be hydroisomerized are passed in either upward or downward flow over the catalyst and along with the requisite quantity of hydrogen. The reaction products are then separated from the hydrogen, which is recycled if desired, and the products are subjected to fractionation and separation for recovery of the desired reaction products. Recovered starting material may be recycled so that the overall process yield is high. In continuous processing, the hourly liquid space velocity will be maintained within the general range of from about 0.25 to about 100 and preferably within the range of from about 1.0 to about 20. Another means of effecting the hydroisomerization reaction of the present invention is to employ a fluidized fixed bed of catalyst wherein the reactant or reactants are passed upwardly through a bed of catalytic material at a sufficient rate to maintain the individual particles of catalyst in a state of hindered settling. However, the rate of passage of the reactant through the bed is not so great so as to suspend the catalytic material in the stream of hydroisomerizable compound and carry it out of the reaction zone. As is readily apparent to one skilled in the art, smaller size particles than hereinabove described are more suitable for such a modified operation. If desired, the catalyst may be utilized in the form of so-called micro size particles and the process may be effected in a two zone fluidized transfer process. In such a process, when it is desired to regenerate the catalyst or to reactivate it by other means, the catalytic material may be suspended in a gas stream and conveyed to a second zone in which it is contacted with the reactivating material, after which the reactivated catalyst is returned to the reaction zone where it may be utilized to effect further reactions. Another suitable two zone system may be the use of a moving bed wherein a dense bed of the catalytic material slowly descends through the reaction zone, where it is discharged from the lower portion thereof into a reactivation zone from which it is transported again to the top of a fixed bed in the reaction zone to again descend through the reaction zone effecting further reactions in transit. Regardless of the particular operation employed, catalyst activity will be maximized by treating the catalyst, prior to use, by the process steps set forth hereinabove. In any of the different methods of utilization of this process, the reaction products may be fractionated or otherwise separated to recover the desired reaction zone product and to separate unconverted material which may be recycled. Hydrogen in the effluent product likewise is separated and preferably is recycled.

The following examples were carried out in a bench scale apparatus. The reactor used consisted of a stainless steel tube of about 1" inside diameter, about 50" long (with a ¼" thermowell) placed in an electrically heated aluminum bronze block furnace. The upper section of the reactor consisted of a spirally grooved stainless steel preheat section while the space below the catalyst bed was filled with stainless steel spacers. The hydrocarbon was fed to the reactor using a pump at rates set forth hereinafter. The hydrogen charged to the reactor was supplied from a high pressure hydrogen cylinder and hydrogen was recycled within the unit. The hydrogen and hydrocarbon were introduced to the top of the reactor from which they flowed down through the preheat section, through the catalyst, and out of the reactor. The reaction products were condensed, cooled to room temperature, and a phase separation was effected in a high pressure receiver. The liquid product was collected, stabilized to remove low boiling hydrocarbons, and the desired boiling range reaction products were analyzed by vapor phase chromatographic techniques.

The following examples are introduced to illustrate further the novelty and utility of the process of the present invention but with no intention of unduly limiting the same. These examples are introduced further to illustrate the experiments carried out to obtain the data hereinafter described with reference to the drawing.

EXAMPLE I

The catalyst utilized in this example and in the following examples for the hydroisomerization of n-pentane was prepared generally as set forth hereinabove. More specifically, the catalyst comprising platinum-fluoride-alumina was prepared by the general method of dissolving aluminum pellets in hydrochloric acid to form a sol containing about 15% aluminum. Sufficient hydrofluoric acid was added to the sol so that the catalyst, prior to use, contained about 4.6% fluorine. The resultant sol was then mixed with hexamethylenetetramine in a continuous mixer and dropped into an oil bath maintained at about 90° C. to form spheres. The spheres were aged in the oil, and then in an aqueous solution of ammonia. The ammonium hydroxide washed spheres were then transferred to a drier, dried at about 250° C., and calcined at about 650° C. The synthetically prepared alumina spheres containing combined fluorine were then impregnated with a dilute solution of chloroplatinic acid containing 1% HCl based on the dry alumina and 1% nitric acid based on the dry alumina. The amount of platinum in the solution was adjusted so that the final composite contained about 0.375% platinum by weight based on the dry alumina. The thus impregnated composite was then dried and calcined in air at a temperature of about 500° C. The finished catalyst contained 0.375% by weight platinum, about 4.6% by weight combined fluorine, and the remainder was alumina. Sufficient amount of this catalyst was prepared for use in the following experiments.

In this and the following examples, a charge stock comprising chemically pure n-pentane was utilized. A typical analysis for this charge stock is 99.3% n-pentane and 0.7% isopentane. Before use, a sufficient amount of thiophene was added to this charge stock so that it contained 0.005 weight percent sulfur. In this example, a 75 cc. quantity of the above prepared catalyst was placed as a fixed bed in the reaction tube and tested for activity for hydroisomerization of the above described feed stock at a pressure of 500 p.s.i.g., at a hydrogen to hydrocarbon mol ratio of 0.9:1, at an hourly liquid space velocity of about 3, and at a temperature of 330° C. Before passing the feed stock into the unit, hydrogen was passed over this catalyst for four hours time at 330° C. and 0 p.s.i.g. The amount of hydrogen utilized was 4.5 standard cubic feet per hour. Reactor pressure was raised to 500 p.s.i.g. over a one hour period of time at this temperature and then hydrogen at the rate of 3.12 standard cubic feet per hour was passed over the catalyst for five hours at this same temperature of 330° C. At the end of this time, n-pentane and hydrogen was passed into the plant, and after a line-out period of six hours, a test period was carried out from six through ten hours on stream. Vapor phase chromatographic analysis of the $C_5$ portion of the product showed that it contained 12.9% isopentane and 87.1% n-pentane. The debutanizer overhead gas production was 476 standard cubic feet per barrel, indicating a high hydrocracking activity of this catalyst. The $C_5$ portion of the product, on a weight basis, was found to equal 74.7%. Thus, 25.3% of the feed stock was cracked to lower boiling components. The catalyst, after use, contained 0.06% by weight of carbon. The 12.9% conversion to isopentane at 330° C. is plotted on the attached drawing as the 330° C. curve.

EXAMPLE II

This example illustrates the use of another sample of the same catalyst, prereduced at 500° C., for the processing of the same charge stock. Again in this example, 75 cc. (43.5 grams) of the same catalyst was utilized. Prereduction procedure included one hour at 500° C. and 0 p.s.i.g., during which time 5.7 standard cubic feet of hydrogen per hour were passed over the catalyst. Plant pressure was then raised to 500 p.s.i.g. over a two hour period at 500° C. Plant pressure was then dropped to 350 p.s.i.g. at 500° C. and 3.12 standard cubic feet of hydrogen were passed over the catalyst for a one hour period. The catalyst temperature was then allowed to decrease to 330° C. and the feed stock along with hydrogen was then passed into the plant. Processing conditions utilized in this example included a pressure of 350 p.s.i.g., a temperature of 330° C., a liquid hourly space velocity of about 3, and a hydrogen to hydrocarbon mol ratio of 2:1. After a five hour lineout period, a test period was carried out from five to eight hours on stream. Vapor phase chromatographic analysis of the $C_5$ portion of the product showed that it contained 43.5% isopentane and 56.5% n-pentane. Debutanizer overhead gas equaled 26 standard cubic feet per barrel indicating a very low amount of hydrocracking with this catalyst. In round numbers, about 20 standard cubic feet per barrel of debutanizer overhead gas is equal to 1% by weight loss based on the feed. Thus, the prereduction at 500° C. substantially increased conversion of n-pentane to isopentane while at the same time decreasing cracking. The conversion point of 43.5% isopentane at 330° C. is plotted on the attached drawing as the 500° C. curve.

EXAMPLE III

This example illustrates the use of another sample of the same catalyst, prereduced at 550° C., for the processing of the same charge stock. In this example, 75 cc. (45.5 grams) of the same catalyst was utilized. Prereduction procedure included four hours at 550° C. and 0 p.s.i.g. during which time the hydrogen was passed over the catalyst at a rate of 5.6 standard cubic feet per hour. Plant pressure was then raised to 500 p.s.i.g. over a one hour period at this temperature of 550° C. Hydrogen circulation was again commenced and for the next five hours, 3.12 standard cubic feet of hydrogen per hour were passed over the catalyst at 500 p.s.i.g. and at 550° C.

The catalyst temperature was then allowed to decrease to 310° C. and feed stock along with hydrogen was then passed into the plant. The processing conditions included a pressure of 500 p.s.i.g., a liquid hourly space velocity of about 3, a hydrogen to hydrocarbon mol ratio of 2:1, and temperatures of 310°, 320° and 330° C. The results obtained by this prereduction technique are presented in the following Table 1.

*Table 1.—Hydroisomerization of n-pentane in the presence of a catalyst comprising alumina, platinum, and combined halogen, prereduced at 550° C.*

| Period No. | 1 | 2 | 3 |
|---|---|---|---|
| Charge | n-pentane | n-pentane | n-pentane. |
| Catalyst Pretreatment Temp., °C. | 550 | 550 | 550. |
| On Stream, Hrs | 26-30 | 36-40 | 46-50. |
| Conditions: | | | |
| Pressure, p.s.i.g | 500 | 500 | 500. |
| Temperature, °C | 311 | 320 | 330. |
| LHSV | 3.0 | 2.99 | 2.97. |
| Mol Ratio, H$_2$/Charge | 2.0 | 2.0 | 2.0. |
| Results: | | | |
| Vapor Phase Chromatography, wt. percent: | | | |
| Isopentane | 39.8 | 49.2 | 56.4. |
| n-pentane | 60.2 | 50.8 | 43.6. |
| Debutanizer Overhead Gas, s.c.f./bbl. | 49 | 59 | 72. |

The above results are better than those obtained in Example I and somewhat better than those obtained in Example II. The further increase in prereduction temperature results in a more active catalyst here. The catalyst after use contained 0.11% carbon. The conversion to isopentane at the three temperatures is plotted on the attached drawing and forms a part of the number of points used in defining the 550° C. curve.

EXAMPLE IV

This example illustrates the use of another sample of the same catalyst, prereduced at 550° C., for the processing of the same charge stock. In this example, 75 cc. (45.3 grams) of the same catalyst was utilized. Prereduction procedure included four hours at 550° C. and 0 p.s.i.g., during which time hydrogen was passed over the catalyst at a rate of about 5 standard cubic feet per hour. Plant pressure was then raised to 500 p.s.i.g. over a one hour period at this temperature of 550° C. Hydrogen circulation was again commenced and for the next five hours, 3.1 standard cubic feet per hour were passed over the catalyst at 500 p.s.i.g. and at 550° C. The catalyst temperature was then allowed to decrease to 310° C. and the feed stock along with hydrogen was then passed into the plant. The processing conditions included a pressure of 500 p.s.i.g., a liquid hourly space velocity of about 3, a hydrogen to hydrocarbon mol ratio of about 2:1, and temperatures of 310°, 320° and 330° C. The results obtained by this prereduction technique are presented in the following Table 2.

*Table 2.—Hydroisomerization of n-pentane in the presence of a catalyst comprising alumina, platinum, and combined halogen, prereduced at 550° C.*

| Period No. | 4 | 5 | 6 |
|---|---|---|---|
| Charge | n-pentane | n-pentane | n-pentane. |
| Catalyst Pretreatment Temp., °C. | 550 | 550 | 550. |
| On Stream, Hrs | 26-30 | 36-40 | 46-50. |
| Conditions: | | | |
| Pressure, p.s.i.g | 500 | 500 | 500. |
| Temperature, °C | 310 | 320 | 330. |
| LHSV | 2.97 | 2.96 | 2.97. |
| Mol Ratio, H$_2$/Charge | 1.93 | 1.94 | 1.90. |
| Results: | | | |
| Vapor Phase Chromatography, wt. percent: | | | |
| Isopentane | 41.3 | 50.1 | 58.5. |
| n-pentane | 58.7 | 49.9 | 41.5. |
| Debutanizer Overhead Gas, s.c.f./bbl. | 53 | 62 | 78. |

The above results are better than those in Example I and somewhat better than those obtained in Example II. However, since the experiment was carried out in substantially the same manner as Example III, the conversion versus temperature points are again used to form a basis for the location of the 550° C. curve on the attached drawing. Here again, the same phenomena as noted in Example III was observed, namely, that increase in prereduction temperature resulted in a more active catalyst. The catalyst, after use, contained 0.12% by weight of carbon.

EXAMPLE V

This example illustrates use of another sample of the same catalyst, again prereduced at 550° C., for the processing of the same charge stock. In this example, 75 cc. (44.1 grams) of the same catalyst was utilized. Prereduction procedure included four hours at 550° C. and 0 p.s.i.g., during which time hydrogen was passed over the catalyst at a rate of 5.1 standard cubic feet per hour. Plant pressure was then raised to 500 p.s.i.g. over a one hour period at this temperature of 550° C. Hydrogen circulation was again commenced and for the next five hours, 3.12 standard cubic feet per hour were passed over the catalyst at 500 p.s.i.g., and at 550° C. The catalyst temperature was then allowed to decrease to 310° C. and feed stock, along with hydrogen, was then passed into the plant. The processing conditions included a pressure of 500 p.s.i.g., a liquid hourly space velocity of about 3, a hydrogen to hydrocarbon mol ratio of 2:1, and temperatures of 310°, 320° and 330° C. The results obtained by this prereduction technique are presented in the following Table 3.

*Table 3.—Hydroisomerization of n-pentane in the presence of a catalyst comprising alumina, platinum, and combined halogen, prereduced at 550° C.*

| Period No. | 7 | 8 | 9 |
|---|---|---|---|
| Charge | n-pentane | n-pentane | n-pentane. |
| Catalyst Pretreatment Temp., °C. | 550 | 550 | 550. |
| On Stream, Hrs | 26-30 | 36-40 | 46-50. |
| Conditions: | | | |
| Pressure, p.s.i.g | 500 | 500 | 500. |
| Temperature, °C | 310 | 320 | 330. |
| LHSV | 2.93 | 2.96 | 2.96. |
| Mol Ratio, H$_2$/Charge | 1.96 | 1.95 | 1.92. |
| Results: | | | |
| Vapor Phase Chromatography, wt. percent: | | | |
| Isopentane | 37.2 | 47.4 | 55.4. |
| n-pentane | 62.8 | 52.6 | 44.6. |
| Debutanizer Overhead Gas, s.c.f./bbl. | 51 | 60 | 76. |

Here again, the results are better than those obtained in Example I and somewhat better than those obtained in Example II. The conversion versus temperature data is again plotted on the attached drawing and forms part of the points which are used in defining the 550° C. curve. The catalyst, after use, contained 0.08 weight percent of carbon.

EXAMPLE VI

This example illustrates the use of another sample of the same catalyst, prereduced at 585° C., for the processing of the same charge stock. Again in this example, 75 cc. (45.3 grams) of the same catalyst was utilized. The prereduction procedure included four hours at 585° C. and 0 p.s.i.g., during which time 6.0 standard cubic feet per hour of hydrogen were passed over the catalyst. Plant pressure was then raised to 500 p.s.i.g. over a one hour period at 585° C. At this pressure of 500 p.s.i.g. and temperature of 585° C., 3.12 standard cubic feet of hydrogen per hour were passed over the catalyst for five hours. The catalyst temperature was then allowed to decrease to 310° C. and the feed stock, along with hydrogen, was then passed into the plant. Processing conditions utilized in this example included a pressure of 500 p.s.i.g., a liquid hourly space velocity of about 3, a hydrogen to hydrocarbon mol ratio of about 2, and temperatures of 310°, 320° and 330° C. The results obtained at these three temperatures are present in the following Table 4.

Table 4.—*Hydroisomerization of n-pentane in the presence of a catalyst comprising alumina, platinum, and combined halogen, prereduced at 585° C.*

| Period No. | 10 | 11 | 12 |
|---|---|---|---|
| Charge | n-pentane | n-pentane | n-pentane. |
| Catalyst Pretreatment Temp., °C. | 585 | 585 | 585. |
| On Stream, Hrs | 26–30 | 36–40 | 46–50. |
| Conditions: | | | |
| Pressure, p.s.i.g. | 500 | 500 | 500. |
| Temperature, °C. | 310 | 321 | 329. |
| LHSV | 2.95 | 3.01 | 2.95. |
| Mol Ratio, H₂/Charge | 2.0 | 2.0 | 2.0. |
| Results: | | | |
| Vapor Phase Chromatography, wt. percent: | | | |
| Isopentane | 45.0 | 53.6 | 58.1. |
| n-pentane | 55.0 | 46.4 | 41.9. |
| Debutanizer Overhead Gas, s.c.f./bbl. | 55 | 66 | 80. |

These results again illustrate a further increase in catalyst activity by further increasing prereduction temperature to 585° C. The temperature versus conversion data is plotted on the attached drawing and forms the basis for the curve designated as that at 585° C. prereduction temperature. The catalyst, after use, contained 0.06 weight percent carbon.

EXAMPLE VII

This example illustrates the use of another sample of the same catalyst, prereduced at 640° C., for the processing of the same charge stock. Again in this example, 75 cc. (45.2 grams) of the same catalyst were utilized. The prereduction procedure included four hours at 640° C. and 0 p.s.i.g. during which time 6.2 standard cubic feet of hydrogen per hour were passed over the catalyst. The plant pressure then was raised to 500 p.s.i.g. over a one hour period at 640° C. At this temperature and pressure condition, hydrogen circulation in the quantity of 6.12 standard cubic feet of hydrogen per hour was established and continued for five hours time. The catalyst temperature was then allowed to decrease to 310° C. and the feed stock, along with hydrogen, was then passed into the plant. The processing conditions utilized in this example included a pressure of 500 p.s.i.g., a liquid hourly space velociy of about 3, a hydrogen to hydrocarbon mol ratio of 2:1, and temperatures of 310°, 320° and 330° C. The results obtained are presented in the following Table 5.

Table 5.—*Hydroisomerization of n-pentane in the presence of a catalyst comprising alumina, platinum, and combined halogen, prereduced at 640° C.*

| Period No. | 13 | 14 | 15 |
|---|---|---|---|
| Charge | n-pentane | n-pentane | n-pentane. |
| Catalyst Pretreatment Temp., °C. | 640 | 640 | 640. |
| On Stream, Hrs | 26–30 | 36–40 | 46–50. |
| Conditions: | | | |
| Pressure, p.s.i.g. | 500 | 500 | 500. |
| Temperature, °C. | 312 | 320 | 329. |
| LHSV | 2.96 | 2.97 | 2.95. |
| Mol Ratio, H₂/Charge | 2.0 | 2.0 | 2.0. |
| Results: | | | |
| Vapor Phase Chromatography, wt. percent: | | | |
| Isopentane | 48.3 | 56.5 | 60.6. |
| n-pentane | 51.7 | 43.5 | 39.4. |
| Debutanizer Overhead Gas, s.c.f./bbl. | 59 | 75 | 93. |

These results again show a further increase in catalyst activity with an increase in prereduction temperature. After use, the catalyst contained 0.04 percent by weight of carbon. However, this prereduction temperature cannot be raised indefinitely since sintering of the catalyst starts to occur at temperatures above about 700° C.

EXAMPLE VIII

This example illustrates the use of another sample of the same catalyst, prereduced at 550° C., exposed to air containing water vapor, and retreated with hydrogen at 550° C., for the processing of the same charge stock. Again in this example, 75 cc. (43.7 grams) of the same catalyst were utilized. The initial prereduction procedure included four hours at 550° C. and 0 p.s.i.g. during which time about 5 standard cubic feet of hydrogen per hour were passed over the catalyst. The plant pressure was then raised to 500 p.s.i.g. at 550° C. while circulating hydrogen at the rate of 3 standard cubic feet per hour over a six hour period. The catalyst temperature was then allowed to decrease to 300° C. while circulating hydrogen at the rate of 3 standard cubic feet per hour over a four hour period. The plant pressure was then decreased from 500 p.s.i.g. to 0 p.s.i.g. and the reactor cooled to room temperature while maintaining hydrogen circulation. When the catalyst had reached room temperature, it was removed from the reactor and exposed to air containing water vapor for twenty-four hours. The sample of catalyst was then reinserted in the reactor and retreated with hydrogen, first at 0 p.s.i.g. and 550° C. for a two hour period while circulating 5.2 standard cubic feet of hydrogen per hour. At this pressure and hydrogen circulation rate, the temperature was dropped from 550° C. to 310° C. over a four hour period. Then, at 310° C., the plant pressure was raised to 500 p.s.i.g. while circulating hydrogen at the rate of 3.1 standard cubic feet per hour over a one and three-fourths hours period. This hydrogen retreatment and circulation was continued at the same rate for an additional two hours at 500 p.s.i.g. and 310° C. At the expiration of this period of time, the feed stock, along with hydrogen, was then passed into the plant. The processing conditions utilized in this examples included a pressure of 500 p.s.i.g., a liquid hourly space velocity of about 3, a hydrogen to hydrocarbon mol ratio of 2:1, and temperatures of 310°, 320° and 330° C. The results obtained are presented in the following Table 6.

Table 6.—*Hydroisomerization of n-pentane in the presence of a catalyst comprising alumina, platinum, and combined halogen, prereduced at 550° C., exposed to air containing water vapor, and rereduced at 550° C.*

| Period No. | 16 | 17 | 18 |
|---|---|---|---|
| Charge | n-pentane | n-pentane | n-pentane. |
| Catalyst Pretreatment: | | | |
| Initial Reduction Temperature, °C. | 550 | 550 | 550. |
| Exposure to Air Containing Water Vapor, °C. | room | room | room. |
| Rereduction Temperature, °C. | 550 | 550 | 550. |
| On Stream, Hrs | 5–6 | 11–12 | 17–18. |
| Conditions: | | | |
| Pressure, p.s.i.g. | 500 | 500 | 500. |
| Temperature, °C. | 309 | 320 | 330. |
| LHSV | 2.97 | 2.97 | 3.04. |
| Mol Ratio, H₂/Charge | 2.0 | 2.0 | 2.0. |
| Results: | | | |
| Vapor Phase Chromatography, wt. percent: | | | |
| Isopentane | 37.6 | 44.2 | 54.2. |
| n-pentane | 62.4 | 55.8 | 45.8. |
| Debutanizer Overhead Gas, s.c.f./bbl. | 52 | 64 | 80. |

When the percent conversion to isopentane versus temperature data obtained herein is plotted on the attached drawing, it is interesting to note that these points fall on the curve previously obtained for the initial prereduction at 550° C. In other words, no further advantages are observed by exposing this catalyst to air containing water vapor at room temperature, followed by rereduction at 550° C. Here again, the catalyst, after use, contained very little carbon, namely 0.07% by weight.

EXAMPLE IX

This example illustrates the use of another sample of the same catalyst, prereduced at 550° C., exposed to air containing water vapor, and retreated with hydrogen at 550° C., for the processing of the same n-pentane charge stock. Again in this example, 75 cc. (43.5 grams) of the same catalyst were utilized. Initial prereduction period included four hours at 550° C. and 0 p.s.i.g. during which time 5 standard cubic feet of hydrogen per hour were passed over the catalyst. The plant pressure was then raised to 500 p.s.i.g. while circulating hydrogen at the rate of 3 standard cubic feet per hour over a six hour period. The catalyst temperature was then allowed to decrease to 300° C. while circulating hydrogen at the rate of 3 standard cubic feet per hour over a four hour period. The plant pressure was then decreased from 500 to 0 p.s.i.g. and the reactor cooled to room temperature while maintaining hydrogen circulation. When the catalyst had reached room temperature, it was removed from the reactor and exposed to air containing water vapor for seventy-two hours. The sample of catalyst was then reinserted in the reactor and retreated with hydrogen, first at 0 p.s.i.g. and 550° C. for a two hour period while circulating 5.4 standard cubic feet of hydrogen per hour. At this pressure, the temperature was dropped from 550° to 310° C. over a four hour period. At this temperature of 310° C., the plant pressure was raised to 500 p.s.i.g. over a one hour period. Then, at 310° C. and 500 p.s.i.g., 3.1 standard cubic feet of hydrogen per hour was passed over the catalyst for a one hour period. At the expiration of this period of time, the feed stock, along with hydrogen, was then passed into the plant. The processing conditions utilized in this example included a pressure of 500 p.s.i.g., a liquid hourly space velocity of about 3, a hydrogen to hydrocarbon mol ratio of 2:1, and temperatures of 310°, 320° and 330° C. The results obtained are presented in the following Table 7.

Table 7.—Hydroisomerization of n-pentane in the presence of a catalyst comprising alumina, platinum, and combined halogen, prereduced at 550° C., exposed to air containing water vapor, and rereduced at 550° C.

| Period No | 19 | 20 | 21 |
|---|---|---|---|
| Charge | n-pentane | n-pentane | n-pentane |
| Catalyst Pretreatment: | | | |
|   Initial Reduction Temperature, ° C. | 550 | 550 | 550 |
|   Exposure to Air Containing Water Vapor, ° C. | room | room | room |
|   Rereduction Temperature, ° C. | 550 | 550 | 550 |
| On Stream, Hrs | 5–6 | 11–12 | 17–18 |
| Conditions: | | | |
|   Pressure, p.s.i.g | 500 | 500 | 500 |
|   Temperature, ° C | 310 | 319 | 330 |
|   LHSV | 2.96 | 2.92 | 2.92 |
|   Mol Ratio, H₂/Charge | 2.0 | 2.0 | 2.0 |
| Results: | | | |
|   Vapor Phase Chromatography, wt. percent: | | | |
|     Isopentane | 37.6 | 46.9 | 54.6 |
|     n-pentane | 62.4 | 53.1 | 45.4 |
|   Debutanizer Overhead Gas, s.c.f./bbl | 51 | 64 | 91 |

Here again, when the percent conversion to isopentane versus temperature data obtained is plotted on the attached drawing, it falls on the curve previously obtained for the initial prereduction at 550° C. In other words, no additional maximizing of catalyst activity is obtained by exposing this catalyst to air containing water vapor at room temperature, following by rereduction at 550° C. The catalyst, after use, contained very little carbon, namely 0.07% by weight.

EXAMPLE X

This example illustrates the use of another sample of the same catalyst, prereduced at 550° C., exposed to air containing water vapor, and retreated with hydrogen at hydroisomerization conditions, for the processing of the same charge stock. In this example, 75 cc. (43.5 grams) of the same catalyst were utilized. Initial prereduction procedure included four hours at 550° C. and 0 p.s.i.g. during which time about 5 standard cubic feet of hydrogen per hour were passed over the catalyst. The plant pressure was then raised to 500 p.s.i.g. at 550° C. while circulating hydrogen at the rate of 3 standard cubic feet per hour over a six hour period. At this pressure of 500 p.s.i.g., the catalyst temperature then was allowed to decrease from 550° to 300° C. while circulating hydrogen at the rate of 3 standard cubic feet per hour over a four hour period. The plant pressure was then decreased from 500 to 0 p.s.i.g. and the reactor cooled to room temperature while maintaining hydrogen circulation. When the catalyst had reached room temperature, it was removed from the reactor and exposed to air containing water vapor for forty-eight hours. The sample of catalyst was then reinserted in the reactor and retreated with hydrogen at 0 p.s.i.g. and 310° C. for two hours by circulating 5.8 standard cubic feet of hydrogen per hour. Then, at this temperature of 310° C., the pressure was raised from 0 to 500 p.s.i.g. over a one hour period while circulating hydrogen at the rate of 3.5 standard cubic feet per hour. Hydrogen circulation was continued for an additional one hour period at the rate of 3.1 standard cubic feet per hour at 500 p.s.i.g. and 310° C. At the expiration of this period of time, the feed stock, along with hydrogen, was then passed into the plant. The processing conditions utilized in this example included a pressure of 500 p.s.i.g., a liquid hourly space velocity of about 3, a hydrogen to hydrocarbon mol ratio of about 2:1, and temperatures of 310°, 320° and 330° C. The results obtained are presented in the following Table 8.

Table 8.—Hydroisomerization of n-pentane in the presence of a catalyst comprising alumina, platinum, and combined halogen, prereduced at 550° C., exposed to air containing water vapor, and rereduced at hydroisomerization conditions

| Period No | 22 | 23 | 24 |
|---|---|---|---|
| Charge | n-pentane | n-pentane | n-pentane |
| Catalyst Pretreatment: | | | |
|   Initial Reduction Temperature, ° C. | 550 | 550 | 550 |
|   Exposure to Air Containing Water Vapor, ° C. | room | room | room |
|   Rereduction Temperature, ° C. | 310 | 310 | 310 |
| On Stream, Hrs | 5–6 | 11–12 | 17–18 |
| Conditions: | | | |
|   Pressure, p.s.i.g | 500 | 500 | 500 |
|   Temperature, ° C | 309 | 320 | 330 |
|   LHSV | 2.99 | 3.01 | 3.00 |
|   Mol Ratio, H₂/Charge | 2.0 | 2.0 | 2.0 |
| Results: | | | |
|   Vapor Phase Chromatography, wt. percent: | | | |
|     Isopentane | 63.3 | 64.9 | 64.1 |
|     n-pentane | 36.7 | 35.1 | 35.9 |
|   Debutanizer Overhead Gas, s.c.f./bbl | 84 | 122 | 198 |

At the hydroisomerization conditions utilized in this example, the conversion of n-pentane to isopentane is obviously much higher than has been experienced heretofore. Substantial conversions to equilibrium quantities of the isopentane isomer were achieved in each of the test periods. When the temperature versus conversion to isopentane data are plotted on the attached drawing, the points result in a catalyst activity curve which indicates far greater catalyst activity than experienced heretofore. This curve is labeled "550° C., exposure to air containing water vapor, and 310° C." This example amply illustrates the maximizing of catalyst activity by utilization of the process of the present invention in which, prior to use, the catalyst is subjected to pretreatment with hydrogen at high temperature, exposure to air containing water vapor, and retreatment with hydrogen at hydroisomerization conditions. After use, the catalyst utilized in this example contained 0.04% by weight carbon, a further indication that catalyst activity has been maximized without changing the nature of the catalyst.

EXAMPLE XI

This example illustrates the use of another sample of the same catalyst, prereduced at 550° C., exposed to air containing water vapor, and retreated with hydrogen at hydroisomerization conditions, for the processing of the same charge stock. In this example, 75 cc. (43.7 grams) of the same catalyst were utilized. Initial prereduction procedure included four hours at 550° C. and 0 p.s.i.g. during which time about 5 standard cubic feet of hydrogen per hour were passed over the catalyst. The plant pressure was then raised to 500 p.s.i.g. at 550° C. while circulating hydrogen at the rate of 3 standard cubic feet per hour over a six hour period. At this pressure of 500 p.s.i.g., the catalyst temperature then was allowed to decrease from 550 to 300° C. while circulating hydrogen at the rate of 3 standard cubic feet per hour over a four hour period. The plant pressure was then decreased from 500 to 0 p.s.i.g. and the reactor cooled to room temperature while maintaining hydrogen circulation. When the catalyst had reached room temperature, it was removed from the reactor and exposed to air containing water vapor for forty-eight hours. The sample of catalyst was then reinserted in the reactor and retreated with hydrogen at 0 p.s.i.g. and 310° C. for two hours by circulating 5.8 standard cubic feet of hydrogen per hour. Then, at this temperature of 310° C., the pressure was raised from 0 to 500 p.s.i.g. over a one hour period. Hydrogen circulation was again carried out for an additional one hour period at the rate of 3.1 standard cubic feet per hour at these conditions of 500 p.s.i.g. and 310° C. At the expiration of this period of time, the feed stock, along with hydrogen, was passed into the plant. The processing conditions utilized in this example included a pressure of 500 p.s.i.g., a liquid hourly spaced velocity of about 3, a hydrogen to hydrocarbon mol ratio of 2:1, and temperatures ranging from 250° to 330° C. The results obtained are presented in the following Table 9.

temperature versus conversion to isopentane data are plotted on the attached drawing, and along with the points from Example X, result in the curve labeled "550° C., exposure to air containing water vapor, and 310° C." Obviously, the catalyst which has been pretreated in this manner is of much higher activity than the other catalyst pretreatments set forth hereinabove. Thus, this example again illustrates the maximizing of catalyst activity by utilization of the process of the present invention in which, prior to use, the catalyst is subjected to pretreatment with hydrogen at high temperature, exposure to air containing water vapor, and retreatment with hydrogen at hydroisomerization conditions. After use, the catalyst utilized in this example contained 0.05% by weight carbon, a further indication that catalyst activity has been maximized without changing the nature of the catalyst.

We claim as our invention:

1. In a process for the hydroisomerization of an isomerizable hydrocarbon at hydroisomerization conditions in the presence of hydrogen and a calcined catalyst comprising a refractory oxide, a platinum group metal, and combined halogen, the improvement which comprises (1) treating said calcined catalyst with hydrogen at a temperature of from about 425° to about 700° C., (2) exposing said catalyst to air containing water vapor, and (3) retreating said catalyst with hydrogen at hydroisomerization conditions including a temperature of from about 250° to about 400° C., steps (1), (2) and (3) being carried out prior to contact of said catalyst with the hydrocarbon and before the accumulation of carbonaceous deposits thereon.

2. In a process for the hydroisomerization of an isomerizable saturated hydrocarbon at hydroisomerization conditions in the presence of hydrogen and a calcined catalyst comprising a refractory metal oxide, a platinum group metal, and combined halogen, the improvement which comprises (1) treating said calcined catalyst with hydrogen at a temperature of from about 425° to about 700° C., (2) exposing said catalyst to air containing water vapor, and (3) retreating said catalyst with hydrogen at hydroisomerization conditions including a temperature of from about 250° to about 400° C., steps (1), (2) and (3) being carried out prior to contact of said catalyst with the saturated hydrocarbon and before the accumulation of carbonaceous deposits thereon.

Table 9.—*Hydroisomerization of n-pentane in the presence of a catalyst comprising alumina, platinum, and combined halogen, prereduced at 550° C., exposed to air containing water vapor, and rereduced at hydroisomerization conditions*

| Period No | 25 | 26 | 27 | 28 | 29 | 30 | 31 | 32 | 33 | 34 |
|---|---|---|---|---|---|---|---|---|---|---|
| Charge | n-pentane | | | | | | | | | |
| Catalyst Pretreatment: | | | | | | | | | | |
| Initial Reduction Temperature, °C | 550 | 550 | 550 | 550 | 550 | 550 | 550 | 550 | 550 | 550 |
| Exposure to Air containing water vapor, °C | room | room | room | room | room | room | room | room | room | room |
| Rereduction Temperature, °C | 310 | 310 | 310 | 310 | 310 | 310 | 310 | 310 | 310 | 310 |
| On Stream, Hrs | 5-6 | 11-12 | 17-18 | 23-24 | 29-30 | 35-36 | 41-42 | 47-48 | 53-54 | 59-60 |
| Conditions: | | | | | | | | | | |
| Pressure, p.s.i.g | 500 | 500 | 500 | 500 | 500 | 500 | 500 | 500 | 500 | 500 |
| Temperature, °C | 310 | 320 | 330 | 250 | 261 | 270 | 280 | 291 | 300 | 310 |
| LHSV | 2.99 | 2.97 | 2.97 | 2.96 | 2.96 | 2.95 | 2.92 | 2.96 | 2.95 | 2.91 |
| Mol Ratio, H₂/Charge | 2.0 | 2.0 | 2.0 | 2.0 | 2.0 | 2.0 | 2.0 | 2.0 | 2.0 | 2.0 |
| Results: | | | | | | | | | | |
| Vapor Phase Chromatography, wt. percent: | | | | | | | | | | |
| Isopentane | 61.7 | 64.2 | 64.1 | 9.8 | 10.8 | 17.1 | 26.9 | 38.5 | 48.6 | 58.2 |
| n-pentane | 38.3 | 35.8 | 35.9 | 90.2 | 89.2 | 82.9 | 73.1 | 61.5 | 51.4 | 41.8 |
| Debutanizer Overhead Gas, s.c.f./bbl | 75 | 109 | 142 | 39 | 34 | 39 | 43 | 46 | 58 | 69 |

At the hydroisomerization conditions utilized in this example, the conversion of n-pentane to isopentane is again very much higher than set forth hereinabove except for Example X. Substantial conversions to equilibrium quantities of the isopentane isomer were achieved in the test periods at temperatures of 310° C. and higher. The 3. In a process for the hydroisomerization of an isomerizable paraffin hydrocarbon at hydroisomerization conditions in the presence of hydrogen and a calcined catalyst comprising a refractory metal oxide, a platinum group metal, and combined halogen, the improvement which comprises (1) treating said calcined catalyst with hydrogen at a temperature of from about 425° to about 700° C., (2) exposing said catalyst to air containing water vapor, and (3) retreating said catalyst with hydrogen at hydroisomerization conditions including a temperature of from about 250° to about 400° C., steps (1), (2) and (3) being carried out prior to contact of said catalyst with the paraffin hydrocarbon and before the accumulation of carbonaceous deposits thereon.

4. In a process for the hydroisomerization of an isomerizable cycloparaffin hydrocarbon at hydroisomerization conditions in the presence of hydrogen and a calcined catalyst comprising a refractory metal oxide, a platinum group metal, and combined halogen, the improvement which comprises (1) treating acid calcined catalyst with hydrogen at a temperature of from about 425° to about 700° C., (2) exposing said catalyst to air containing water vapor, and (3) retreating said catalyst with hydrogen at hydroisomerization conditions including a temperature of from about 250° to about 400° C., steps (1), (2) and (3) being carried out prior to contact of said catalyst with the cycloparaffin hydrocarbon and before the accumulation of carbonaceous deposits thereon.

5. In a process for the hydroisomerization of an isomerizable hydrocarbon at hydroisomerization conditions in the presence of hydrogen and a calcined catalyst comprising a refractory metal oxide, platinum, and from about 2.0 to about 5.0% by weight fluorine, the improvement which comprises (1) treating said calcined catalyst with hydrogen at a temperature of from about 425° to about 700° C., (2) exposing said catalyst to air containing water vapor, and (3) retreating said catalyst with hydrogen at hydroisomerization conditions including a temperature of from about 250° to about 400° C., steps (1), (2) and (3) being carried out prior to contact of said catalyst with the hydrocarbon and before the accumulation of carbonaceous deposits thereon.

6. In a process for the hydroisomerization of an isomerizable saturated hydrocarbon at hydroisomerization conditions in the presence of hydrogen and a calcined catalyst comprising a refractory metal oxide, platinum, and from about 2.0 to about 5.0% by weight fluorine, the improvement which comprises (1) treating said calcined catalyst with hydrogen at a temperature of from about 425° to about 700° C., (2) exposing said catalyst to air containing water vapor, and (3) retreating said catalyst with hydrogen at hydroisomerization conditions including a temperature of from about 250° to about 400° C., steps (1), (2) and (3) being carried out prior to contact of said catalyst with the saturated hydrocarbon and before the accumulation of carbonaceous deposits thereon.

7. In a process for the hydroisomerization of an isomerizable paraffin hydrocarbon at hydroisomerization conditions in the presence of hydrogen and a calcined catalyst comprising a refractory metal oxide, platinum, and from about 2.0 to about 5.0% by weight fluorine, the improvement which comprises (1) treating said calcined catalyst with hydrogen at a temperature of from about 425° to about 700° C., (2) exposing said catalyst to air containing water vapor, and (3) retreating said catalyst with hydrogen at hydroisomerization conditions including a temperature of from about 250° to about 400° C., steps (1), (2) and (3) being carried out prior to contact of said catalyst with the paraffin hydrocarbon and before the accumulation of carbonaceous deposits thereon.

8. In a process for the hydroisomerization of an isomerizable cycloparaffin hydrocarbon at hydroisomerization conditions in the presence of hydrogen and a calcined catalyst comprising a refractory metal oxide, platinum, and from about 2.0 to about 5.0% by weight fluorine, the improvement which comprises (1) treating said calcined catalyst with hydrogen at a temperature of from about 425° to about 700° C., (2) exposing said catalyst to air containing water vapor, and (3) retreating said catalyst with hydrogen at hydroisomerization conditions including a temperature of from about 250° to about 400° C., steps (1), (2) and (3) being carried out prior to contact of said catalyst with the cycloparaffin hydrocarbon and before the accumulation of carbonaceous deposits thereon.

9. In a process for the hydroisomerization of an isomerizable hydrocarbon at hydroisomerization conditions in the presence of hydrogen and a calcined catalyst comprising alumina, platinum, and from about 2.0 to about 5.0% by weight fluorine, the improvement which comprises (1) treating said calcined catalyst with hydrogen at a temperature of from about 425° to about 700° C., (2) exposing said catalyst to air containing water vapor, and (3) retreating said catalyst with hydrogen at hydroisomerization conditions including a temperature of from about 250° to about 400° C., steps (1), (2) and (3) being carried out prior to contact of said catalyst with the hydrocarbon and before the accumulation of carbonaceous deposits thereon.

10. In a process for the hydroisomerization of an isomerizable saturated hydrocarbon at hydroisomerization conditions in the presence of hydrogen and a calcined catalyst comprising alumina, platinum, and from about 2.0 to about 5.0% by weight fluorine, the improvement which comprises (1) treating said calcined catalyst with hydrogen at a temperature of from about 425° to about 700° C., (2) exposing said catalyst to air containing water vapor, and (3) retreating said catalyst with hydrogen at hydroisomerization conditions including a temperature of from about 250° to about 400° C., steps (1), (2) and (3) being carried out prior to contact of said catalyst with the saturated hydrocarbon and before the accumulation of carbonaceous deposits thereon.

11. In a process for the hydroisomerization of an isomerizable paraffin hydrocarbon at hydroisomerization conditions in the presence of hydrogen and a calcined catalyst comprising alumina, platinum, and from about 2.0 to about 5.0% by weight fluorine, the improvement which comprises (1) treating said calcined catalyst with hydrogen at a temperature of from about 425° to about 700° C., (2) exposing said catalyst to air containing water vapor, and (3) retreating said catalyst with hydrogen at hydroisomerization conditions including a temperature of from about 250° to about 400° C., steps (1), (2) and (3) being carried out prior to contact of said catalyst with the paraffin hydrocarbon and before the accumulation of carbonaceous deposits thereon.

12. In a process for the hydroisomerization of an isomerizable cycloparaffin hydrocarbon at hydroisomerization conditions in the presence of hydrogen and a calcined catalyst comprising alumina, platinum, and from about 2.0 to about 5.0% by weight fluorine, the improvement which comprises (1) treating said calcined catalyst with hydrogen at a temperature of from about 425° to about 700° C., (2) exposing said catalyst to air containing water vapor and (3) retreating said catalyst with hydrogen at hydroisomerization conditions including a temperature of from about 250° to about 400° C., steps (1), (2) and (3) being carried out prior to contact of said catalyst with the cycloparaffin hydrocarbon and before the accumulation of carbonaceous deposits thereon.

13. In a process for the hydroisomerization of n-butane at hydroisomerization conditions in the presence of hydrogen and a calcined catalyst comprising alumina, platinum, and from about 2.0 to about 5.0% by weight fluorine, the improvement which comprises (1) treating said calcined catalyst with hydrogen at a temperature of from about 425° to about 700° C., (2) exposing said catalyst to air containing water vapor at ambient temperature, and (3) retreating said catalyst with hydrogen at hydroisomerization conditions including a temperature of from about 250° to about 400° C., steps (1), (2) and (3) being carried out prior to contact of said catalyst with the n-butane and before the accumulation of carbonaceous deposits thereon.

14. In a process for the hydroisomerization of n-pentane at hydroisomerization conditions in the presence of hydrogen and a calcined catalyst comprising alumina, platinum, and from about 2.0 to about 5.0% by weight fluorine, the improvement which comprises (1) treating said calcined catalyst with hydrogen at a temperature of from about 425° to about 700° C., (2) exposing said catalyst to air containing water vapor at ambient temperature, and (3) retreating said catalyst with hydrogen at hydroisomerization conditions including a temperature of from about 250° to about 400° C., steps (1), (2) and (3) being carried out prior to contact of said catalyst with the n-pentane and before the accumulation of carbonaceous deposits thereon.

15. In a process for the hydroisomerization of n-hexane at hydroisomerization conditions in the presence of hydrogen and a calcined catalyst comprising alumina, platinum, and from about 2.0 to about 5.0% by weight fluorine, the improvement which comprises (1) treating said calcined catalyst with hydrogen at a temperature of from about 425° to about 700° C., (2) exposing said catalyst to air containing water vapor at ambient temperature, and (3) retreating said catalyst with hydrogen at hydroisomerization conditions including a temperature of from about 250° to about 400° C., steps (1), (2) and (3) being carried out prior to contact of said catalyst with the n-hexane and before the accumulation of carbonaceous deposits thereon.

16. In a process for the hydroisomerization of 2-methylpentane at hydroisomerization conditions in the presence of hydrogen and a calcined catalyst comprising alumina, platinum, and from about 2.0 to about 5.0% by weight fluorine, the improvement which comprises (1) treating said calcined catalyst with hydrogen at a temperature of from about 425° to about 700° C., (2) exposing said catalyst to air containing water vapor at ambient temperature, and (3) retreating said catalyst with hydrogen at hydroisomerization conditions including a temperature of from about 250° to about 400° C., steps (1), (2) and (3) being carried out prior to contact of said catalyst with the 2-methylpentane and before the accumulation of carbonaceous deposits thereon.

17. In a process for the hydroisomerization of methylcyclopentane at hydroisomerization conditions in the presence of hydrogen and a calcined catalyst comprising alumina, platinum, and from about 2.0 to about 5.0% by weight fluorine, the improvement which comprises (1) treating said calcined catalyst with hydrogen at a temperature of from about 425° to about 700° C., (2) exposing said catalyst to air containing water vapor at ambient temperature, and (3) retreating said catalyst with hydrogen at hydroisomerization conditions including a temperature of from about 250° to about 400° C., steps (1), (2) and (3) being carried out prior to contact of said catalyst with the methylcyclopentane and before the accumulation of carbonaceous deposits thereon.

References Cited in the file of this patent

UNITED STATES PATENTS

| | | |
|---|---|---|
| 2,658,028 | Haensel et al. | Nov. 3, 1953 |
| 2,743,215 | Riblett et al. | Apr. 24, 1956 |
| 2,759,897 | Haensel et al. | Aug. 21, 1956 |
| 2,773,014 | Snuggs et al. | Dec. 4, 1956 |
| 2,834,823 | Patton et al. | May 13, 1958 |
| 2,871,277 | Haensel | Jan. 27, 1959 |
| 2,917,565 | Carr | Dec. 15, 1959 |